(No Model.)

R. A. & E. R. HART.
VOTING MACHINE.

No. 598,247.

6 Sheets—Sheet 1.

Patented Feb. 1, 1898.

Witnesses
Thomas L. Stewart
Levi F. Cox

Inventors:
Russell A. Hart. Ellis Ray Hart
By their Attorney Lucius C. West.

(No Model.)

R. A. & E. R. HART.
VOTING MACHINE.

No. 598,247.

6 Sheets—Sheet 2.

Patented Feb. 1, 1898.

Witnesses
Thomas W. Stewart
Levi F. Cox

Inventors:
Russell A. Hart, Ellis Ray Hart,
By their Attorney
Lucius C. West.

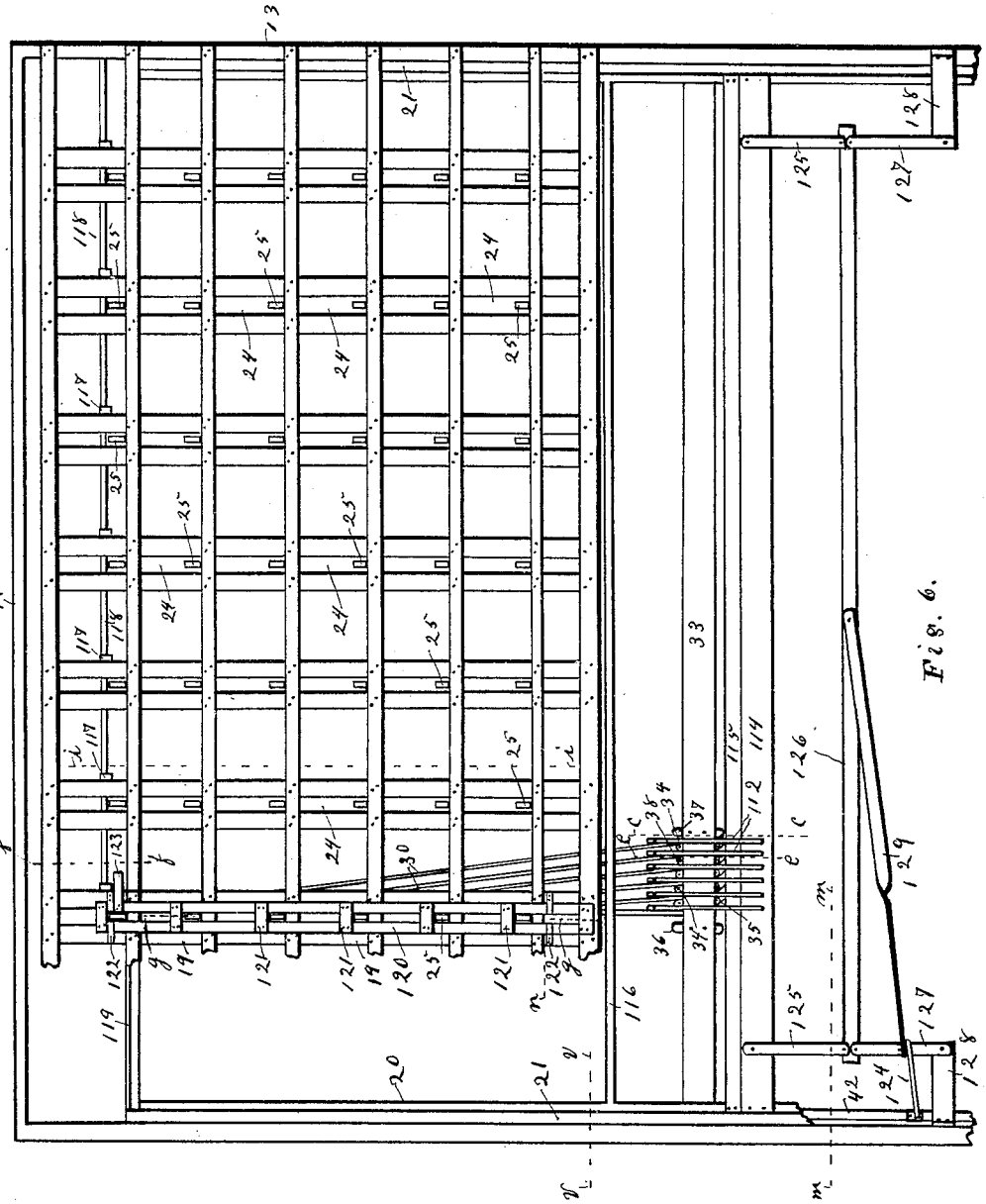

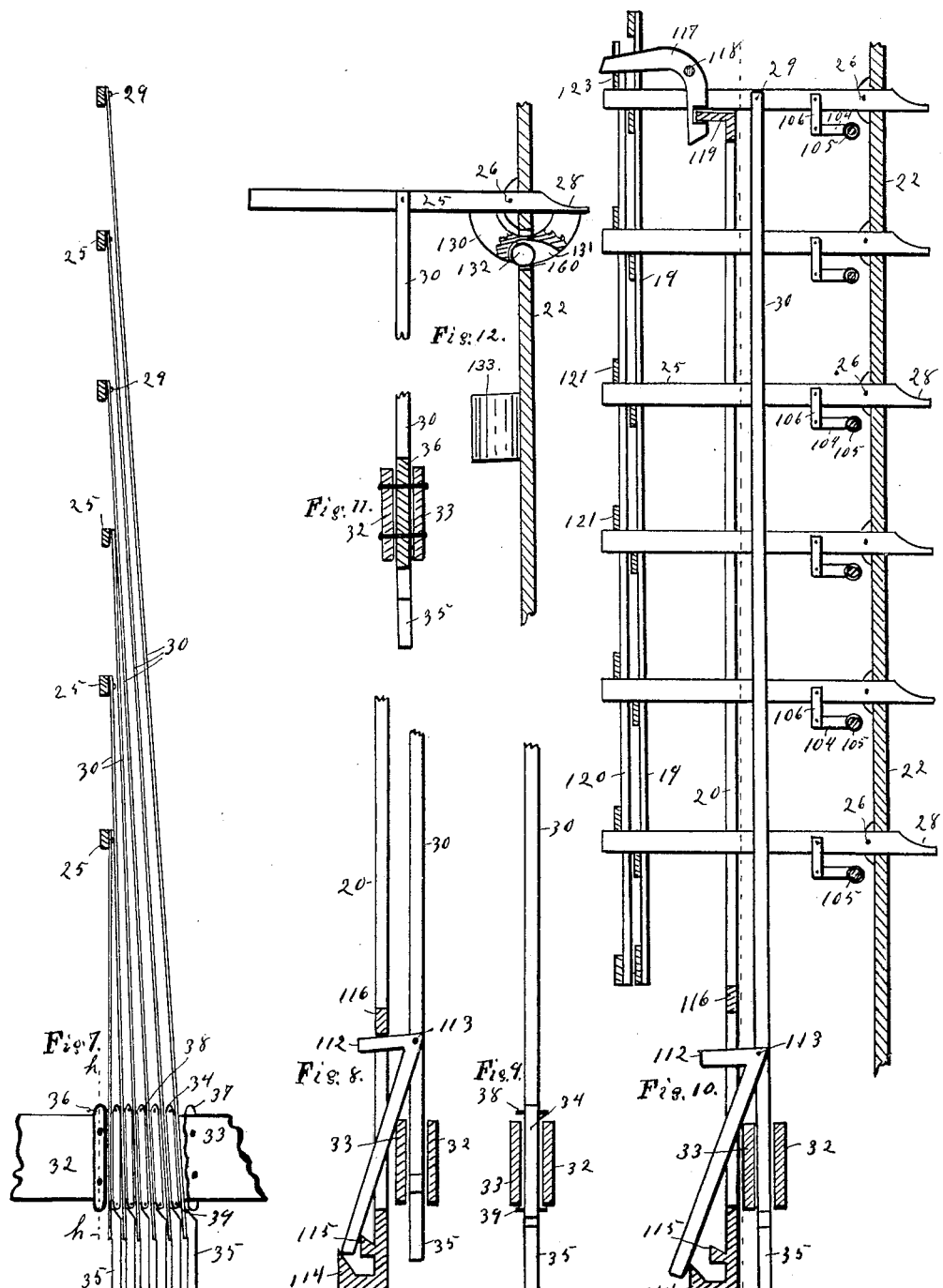

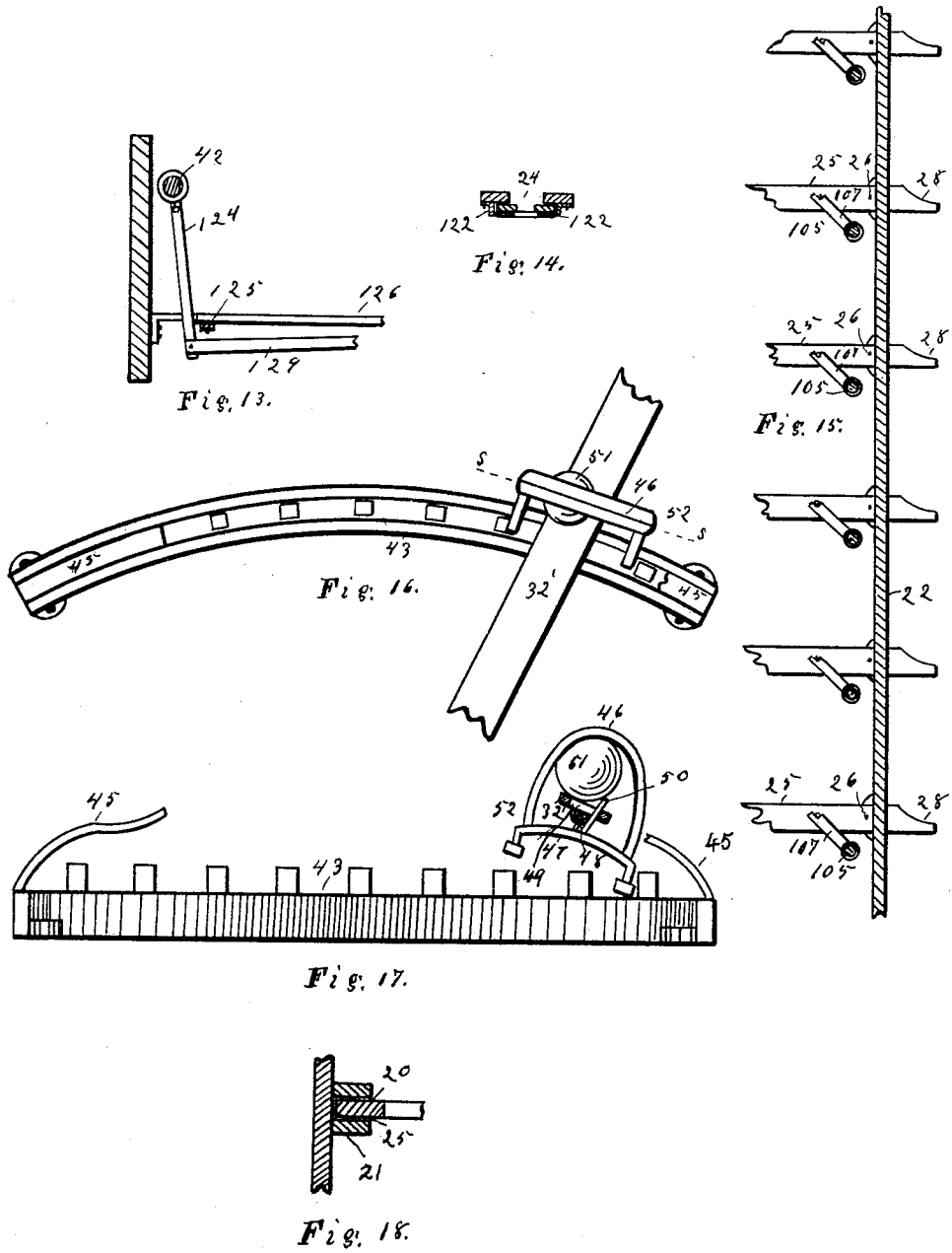

(No Model.)  R. A. & E. R. HART.  6 Sheets—Sheet 6.
VOTING MACHINE.
No. 598,247.  Patented Feb. 1, 1898.

Witnesses  
Thomas W. Stewart  
Rufus Janers

Inventors.  
Russell A. Hart  
Ellis Ray Hart  
By their atty Lucius C. West.

UNITED STATES PATENT OFFICE.

RUSSELL A. HART AND ELLIS RAY HART, OF BATTLE CREEK, MICHIGAN.

VOTING-MACHINE.

SPECIFICATION forming part of Letters Patent No. 598,247, dated February 1, 1898.

Application filed May 18, 1896. Serial No. 592,008. (No model.)

*To all whom it may concern:*

Be it known that we, RUSSELL A. HART and ELLIS RAY HART, of Battle Creek, in the county of Calhoun, State of Michigan, have invented new and useful Improvements in Voting-Machines, of which the following is a specification.

This invention relates to that class of voting-machines which employ pivoted voting keys or levers for operating in the act of voting, means for preventing repeating, and means operated by the door for releasing the voting-levers, so as to be used by the next voter.

One object of the invention is to close the shutters in the rear of the handles of the voting-levers by the action of the door of the voting-booth.

Another object is to provide a vertically-movable frame in connection with a fixed frame, through which frames the voting-levers pass, and means for locking the movable frame in its up position and to be unlocked by the action of the voting-levers.

Another object is to provide new means for locking a voting-lever after it has been operated, so that another voting-lever for the same office cannot be operated by the same voter.

Another object consists in providing the booth with a double door of peculiar construction for going into and out of the booth and a lock for the same, so that one has to be shut before the other can be opened.

Another object is to provide a new lock for the pawl employed in connection with the door-lever.

Another object consists in improved means whereby a voter can vote a straight ticket by operating only one voting-lever.

Another object consists in a construction by means of which a party can vote blank or vote an independent ticket, or else vote a blank in addition to his regular ticket in order to release the voting-lever for the next voter, and also to enable him to open the door to get out of the booth.

Further objects will appear in the following description and claims.

Figure 1:
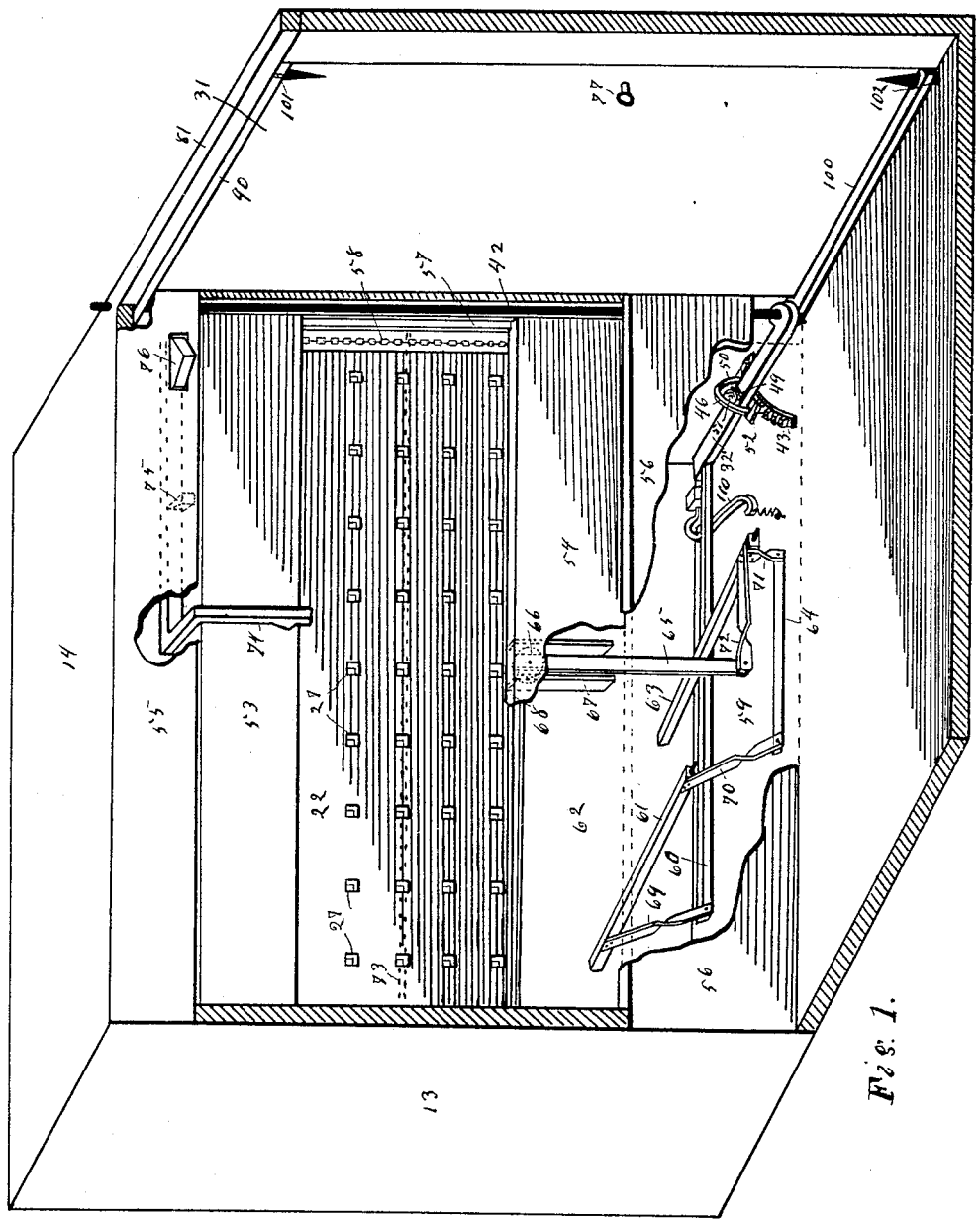
Figure 4:
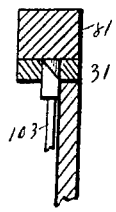
Figure 5:
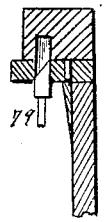
Figure 2:
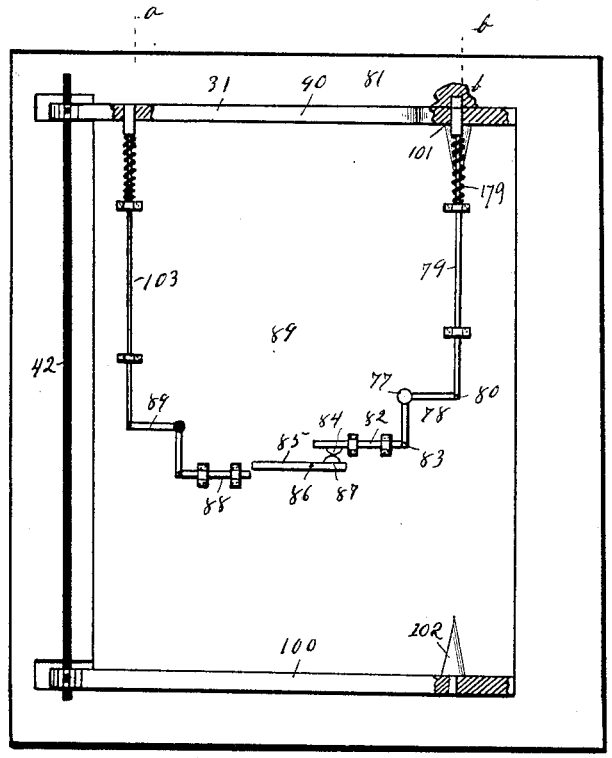
Figure 3:
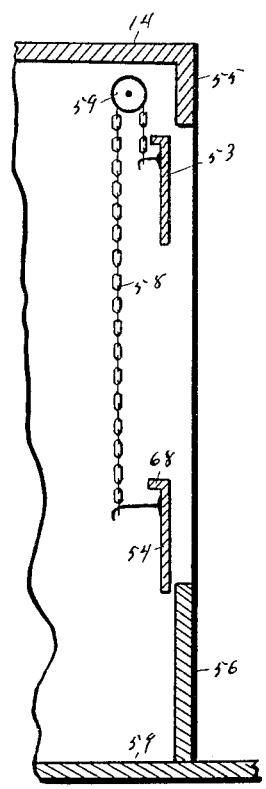
Figure 19:
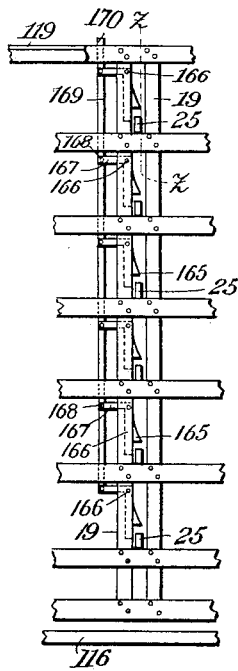
Figure 20:
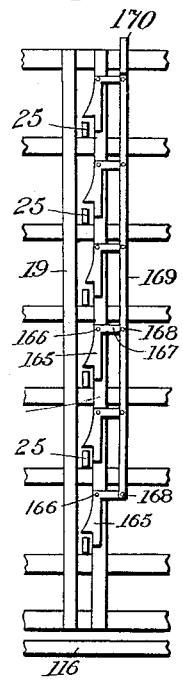
Figure 21:
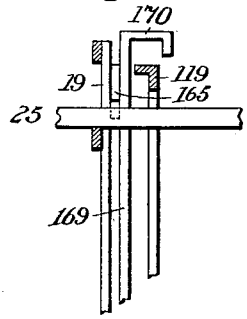
Figure 22:
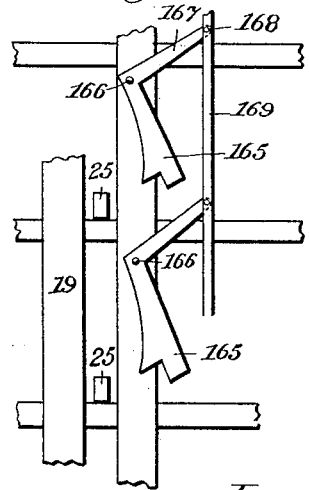

In the drawings forming a part of this specification, Figure 1 is a perspective view of a voting-booth with the rear wall and part of the side wall removed and showing that part of the booth where the voter stands when employing the voting-levers in the act of voting; Fig. 2, an enlarged elevation of the door in Fig. 1; Fig. 3, a vertical section, enlarged, taken on a vertical line near the chain 58 in Fig. 1, looking from a point at the left; Fig. 4, a section on line *a a* in Fig. 2, looking from a point at the right; Fig. 5, a section on line *b b* in Fig. 2, looking from a point at the right; Fig. 6, a front elevation of a voting-booth on that side which is opposite to that shown in Fig. 1, where the voter stands; Fig. 7, enlarged details from Fig. 6, pointed out by like numerals in each figure and below described; Fig. 8, a section, enlarged, taken on line *c c* in Fig. 6, looking from a point at the right and illustrating the operation; Fig. 9, a section, enlarged, on line *e e* in Fig. 6, looking from a point at the right; Fig. 10, an enlarged section on lines *c c, f f,* and *g g* in Fig. 6, looking at the parts on these lines from a point at the right; Fig. 11, a section on line *h h* in Fig. 7, looking from a point at the left; Fig. 12, the same as though taken on line *i i* in Fig. 6, looking from a point at the right; Fig. 13, a section on line *m m* in Fig. 6, looking from a point above; Fig. 14, a section on line *n* in Fig. 6, looking from a point above; Fig. 15, a section on line *i i* in Fig. 6, looking from a point at the right; Fig. 16, a plan of Fig. 17, showing the door-lever and ratchet and pawl; Fig. 17, an elevation of Fig. 16, parts being in section on line *s s* in said Fig. 16; Fig. 18, an enlarged section on line *v v* in Fig. 6, looking from a point above. Fig. 19 shows broken portions of the fixed and movable frames in elevation, illustrating a lock for locking the voting-levers; Fig. 20, a reverse view of the fixed frame in Fig. 19; Fig. 21, a broken section on line *z z* in Fig. 19, looking from a point at the right; and Fig. 22 is an enlarged broken portion of Fig. 20, showing the operation.

The last four figures are enlarged broken parts of the construction pointed out by numerals, which refer to like parts where they appear in other figures, and illustrating a locking device for the voting-levers.

Referring to the parts of the drawings pointed out by numerals, 13 is one end wall, and 14 the top wall, of the voting-booth, Figs. 1 and 6. It will be observed that so far as the number of offices and parties are concerned Figs. 1 and 6 do not correspond, although for the purposes of this description Fig. 1 may illustrate the rear of the same booth of which Fig. 6 illustrates the front view, next to or facing the spectators, or they may illustrate front and rear views of two distinct booths, for they bear no relation to each other in regard to the novelty further than to show which side of the booth faces the voters and which the spectators.

At 20 in Figs. 6 and 10 is a vertically-movable frame having end bearings in grooves 21, Figs. 6 and 18, so that the movable frame can slide up and down therein. In Fig. 6 the fixed frame 19 is broken away at the right-hand end to show the movable frame 20 back of it. We also employ a fixed back wall 22, Figs. 1, 10, and 15. This wall is parallel with and separated from the movable frame. The front frame has a series of vertical slots 24, through which the front end of the voting-levers 25, Figs. 6, 10, and 15, are passed, and when operated on the pivots 26 in the back wall 22 play up and down in said slots.

In Fig. 6 a series of horizontal rows of voting-levers 25 are shown, representing so many political parties, while the vertical rows of these levers stand for the different offices in the parties. The rear ends of these voting-levers in use would be inserted through slots, one for each, in the back wall 22, which the slots 27 in Fig. 1 will serve to illustrate, although their number is less in Fig. 1 and none of the voting-levers are shown in this figure; but of course in a complete machine, as stated, the number of these slots 27 in the rear wall would correspond to the number of the slots 24 in the fixed frame 19. When the voter operates the voting-levers 25, he presses down on the handles 28 of said levers. We have provided means for registering the votes, which means forms subject-matter in another pending application, serially numbered 567,775, and hence so far as this invention is concerned it is sufficient to know what action is required to vote. Pivotally attached to each of the voting-levers at 29 is a vertical bar 30, which bar passes down in the rear of the movable frame 20 and between two parallel strips 32 and 33, said strips being attached at each end to the walls of the booth. Each of these bars passes between what we term "lazy-sticks" 34 and terminates at the lower end in rigidly-attached wedges 35, which wedges are normally below the strips 32 and 33, Figs. 6 and 7. These lazy-sticks 34 are between fixed end stops 36 and 37, attached between the strips 32 and 33, and there are just enough of these lazy-sticks to leave room for one of the wedges 35 to be drawn up between two of them at a time, and when one is thus drawn up by the voter pressing down on the handle of the voting-lever 25 no other voting-lever for that office or that row can be operated, because the space between the stops 36 and 37 will then be filled. Thus a voter can vote for only one office in any party.

In Fig. 7 the wedges are all down, while in Fig. 8 the wedge is partly raised up. Fig. 11 shows how the stops 36 and 37 are attached between the strips 32 and 33. The lazy-sticks 34 are kept from falling down or rising up too far by pins 38 and 39 through each end, as in Figs. 7 and 9. Thus when a wedge is drawn up or pushed down the lazy-sticks will stay in place by the contact of the pins on the strips between which they are located. In Fig. 7 both strips 32 and 33 are broken away, and 33 is broken away in such a manner as to disclose the lazy-sticks between them.

Attached to each vertical bar 30, near the the lower end, is an elbow-lever 112, pivoted at 113, its upper short arm being the heaviest, so its tendency is to fall by gravity and carry the lower end back against the base of the movable frame 20, Figs. 6, 7, and 10. These levers are not shown in Fig. 7, so as to more plainly show the lazy-sticks 34 and the wedges 35, but they are shown in Fig. 6, while in this latter figure the lazy-sticks and wedges are partly hid by the strip 33 and the base of the movable frame in front of them. It should have been stated that there is a series of the bars 30 and elbow-levers 112 for each vertical row of voting-levers and each lever, but only one is here shown, as the rest would be a duplication and not necessary to appear in the application. The base of the movable frame 20 is provided with an inclined ledge or shelf 114, against which ledge the lower end of the elbow-levers 112 rests in the normal state before the voting-levers are operated. Figs. 1 and 10 show the elbow-lever in this condition, as when the voting-lever is in its normal position. When a voting-lever 25 is operated, of course the bar 30 is raised and its particular wedge 35 is raised up between two lazy-sticks 34, and the elbow-lever 112 is raised and catches onto the ledge 114 of the movable frame 20. Just above the ledge 114 is another ledge 115 on the base-bar of the movable frame 20. The construction is such that the act of voting will carry the lower end of the elbow-lever 112 onto the upper ledge 115, and when said lever is on either ledge the voting-lever cannot be brought down again until the movable frame 20 is lowered by the opening of the booth-door, below explained, and hence the voter is prevented from repeating. The drawing up of the wedge, it will be seen, prevents voting for the same office twice, and the lodgment of the elbow-lever on its ledge prevents repeating. The object of two ledges instead of one is to provide means whereby the voter is prevented from raising the voting-lever without its catching onto one of the ledges. In the movable frame 20, just above the upper arm of the elbow-lever 112, is a beam 116, against which beam the upper arm of the elbow-lever contacts when the voting-lever is raised, thus insuring a locking of the lower end of the elbow-lever onto its ledge.

The movable frame 20 is locked in its up position while the voter is in the booth voting by pivoted hooks 117, Fig. 10, which hooks are in the shape of an elbow and are pivoted to a rod 118, which rod is attached to the end walls of the booth just back of the fixed frame at the upper side. There is one of these hooks 117 for each row of vertical voting-levers, and since their upper end is the heaviest they fall by gravity and catch the notched end onto an upper forward flange 119 of the movable frame 20, Fig. 10. On each row of voting-levers 25 is a vertical rack 120, Figs. 6 and 10. This rack is provided with a slat 121 over each voting-lever 25. There is a rack for each vertical row of voting-levers in use; but only one rack is here shown. This rack has guide-bearings back of the cleats 122, as clearly shown by the sectional view in Fig. 14, and in which guide-bearings the rack is adapted to slide vertically. This rack 120 is provided with an upper arm 123, Figs. 6 and 10, which arm contacts with the hook-lever 117 and disengages said hook from the upper flange of the movable frame, so that said movable frame is released so far as any one vote is concerned, and hence the voter must vote for all the offices in some party in order to release all of the hook-levers 117 before the movable frame can move down and release the voting-levers for the use of the next voter.

The booth-door is attached to a hinge-rod 42, Figs. 1, 6, and 13. Attached at a convenient location on this rod is an arm 124, Figs. 6 and 13. This arm is not shown in Fig. 1, but is attached to the rod 42 or one like it in said figure at some point above the arm 32′, (shown in said latter figure,) said arm 32′ being for another purpose described farther on. To each end of the bar 114, attached to the frame 20, is pivoted an arm 125 of a toggle-lever, the other arm 127 being pivotally supported by the arm 128. A rod 129 pivotally connects a bar 126 with an arm 124 of a rod 42, as in Figs. 6 and 13. By this means when the voter goes out of the booth-door the arm 124 will swing and carry the bar 126 to the right, bearing down the toggle-levers, lowering the movable frame, and thus release the voting-levers 25 by freeing the lower end of the elbow-lever 112 from contact with the ledge 115. This position is shown in Fig. 10. In Fig. 8 the lever 112 is on the ledge 114, while a complete upward movement of the voting-lever 25 in the act of voting would, as stated, lodge the lever 112 onto the upper ledge 115. Of course when the door is closed after the voter has entered the booth to vote the toggle-levers will be brought to their normal position, as in Fig. 6, and the movable frame will become locked again by the hook-levers 117, as in Fig. 10, ready for the next voter to use the voting-levers 25.

In Fig. 12 a device is illustrated for the use of the independent voter (the man who does not wish to vote any of the other party-tickets) in carrying out his wishes. There is a slot 160 through the back wall 22 in Fig. 12 just beneath the voting-lever 25, through which slot loosely plays the curved lower extension 130 of the voting-lever when the rear end of the voting-lever is borne down in the act of voting. This curved lower extension 130 is provided with a pocket or open slot 131 on the under side and into which is placed a check 132, and when the voting-lever is operated the pocket, with its check, passes along through the slot 160 in the rear wall 22, and when said voting-lever 25 is pressed entirely down the check will fall into some suitable receptacle, as 133. The design is to have one horizontal row of these voting-levers, as in Fig. 12, with their arms and slots through the back wall, as described. The lowest row would be convenient for this purpose, but not necessarily so. By having blank checks for the other voters they may operate an independent voting-lever and tally their presence in the booth and thus unlock the movable frame and not make a record of a vote for any office on the independent ticket.

In Fig. 1 is shown an arrangement of shutters 53 and 54 for closing the back entrance or access to the handles of the voting-levers, the shutters being operated by the opening of the door when the voter goes out of the booth. An arm 32′, hereinbefore referred to, is rigidly attached to the vertical hinging-rod 42, to which rod the door 31 is rigidly attached in order that when the door is opened and closed the hinge-rod 42 will be rotated in its upper and lower bearings in the booth-closure and thus operate the arm 32′. It is desirable that the door shall be completely open and shut before it can be swung in the opposite direction. This is accomplished by the ratchet-bar 43, similar as before used by us, but in the present instance we have effected improvements in the locking of the pawl 52 in a desired position, so that it will pass over the ratchet-bar 43 in one direction and catch a projection of the ratchet-bar if an effort be made to swing the door in the opposite direction until the pawl 52 is tripped at the ends of the ratchet-bar by passing under arms 45, which happens when the door 31 is entirely open and entirely closed—that is, the complete swing of the door must be made to effect this tripping. These arms 45 are not shown in Fig. 1 in order not to hide other parts.

The pawl 52 consists of a bow 46 above the arm 32′, and has a cross-piece 47, Fig. 17, beneath said arm, which cross-piece is hinged or pivoted to said arm at 48. The arm 32′ is slotted at 49, and a lever 50, which is rigidly attached to the cross-piece 47, passes up through said slot 49 and contacts with a ball 51 at one side of it and a little beneath, as in Fig. 17. The pawl 52 is provided with forwardly-projecting feet which engage projections on the ratchet-bar 43. The ball 51 holds the pawl tilted on one position, so that one end will be up clear of the ratchet-bar until the uppermost end passes beneath the arm 45, when the ball 51 will roll to the other side of the lever 50 and thus hold the pawl tilted the other way. The ball 51 will be retained in place in its course along the bow 46 by being forced upward against and fitting closely within the concavity in the under surface of the bow by means of the arm 32' and lever 50. Now to return to the shutters 53 and 54. The lower shutter is the heaviest, and for this reason said shutters will remain normally separated, as in Figs. 1 and 3, the upper one being up near the wall 55 and the lower one being down near the wall 56. These shutters 53 and 54 are in guideways 57 at each end, in which they slide vertically, only one being shown, and each shutter is connected by a chain 58 at each end, only one being shown, and which chains pass over pulleys 59, Fig. 3. The lower shutter 54 is raised by a lever mechanism, below described, and by the arm 32' when the door 31 swings open, as will be explained.

Back of the handles 28 of the voting-levers 25 and near the floor 59 of the booth is a horizontal bar 60, in position so that its right-hand end can be pushed against by the end of the arm 32' when the door 31 is opened. At 61 is a shaft journaled at each end in the base-wall 56 and 62 of this part of the booth. At 63 is a like shaft and it is likewise journaled. It will be seen that the wall 56 is broken away, but the tenoned ends of the shafts 61 and 63 will indicate their bearings in the wall. At 64 is a horizontal bar, and at 65 is an upright lever, the latter provided at the upper end with a roller 66. (Shown in dotted lines in Fig. 1.) This roller plays up and down in a guideway attached to the shutter 54, and it catches beneath the upper flange 68 when moving upward. The bar 69 is rigidly attached at its upper end to the shaft 61 and is pivotally attached at its lower end to bar 60. The bar 70 is rigidly attached at its upper end to the shaft 61 and pivotally attached at its lower end to the bar 64. The bar 72 is rigidly attached at one end to the shaft 63 and extends back to the lower end of lever 65, to which it is pivotally attached.

A spring-actuated bar is shown at 110 transversely beneath the bar 60, which keeps said bar 60 out to place. By means of this construction when the door 31 is opened the lower shutter 54 will be raised and the upper shutter 53 will be lowered by gravity and the two will meet at the dotted line 73, Fig. 1, thus closing access to the handles of the voting-levers 25. When these shutters are closed, a catch 74 catches on top of the upper shutter and holds them closed until the door 31 is opened inward. This catch is fulcrumed at 75 on the side of the upper wall 55 (shown dotted in Fig. 1) and has a projection or point 76 passed out through a hole in the wall. When the door 31 of the booth is opened inward, it presses on the point 76 and unlocks the catch 74, at which time the shutters 53 and 54 will automatically open by the gravity of the lower shutter. In this connection it should be noticed that the incoming voter swings the door inward from left to right and the outgoing voter swings the door outward from right to left. This door 31 can be opened from both ways, as indicated. The door as a whole is hinged by attachment to the hinge-rod 42, as before stated, and it is opened by the voter going out of the booth after having voted by the use of the knob 77 on the inside of the door. A bell-crank 78 is attached to this knob, Fig. 2, and a spring-actuated vertically-moving catch 79 is pivotally attached to it at the lower end at 80. This catch 79 passes up into a mortise in the framework 81 over the door 31. The upward movement of the catch is limited by the upper closure of said mortise or pocket.

At 82 is a horizontally-sliding bar pivotally attached at 83 to the bell-crank 78 and is provided at the other end and on the under side with a cam projection 84. At 85 is a lever pivoted to the door between its two ends at 86, which lever is provided with a cam projection beneath 84 at 87. When these cam projections rest directly one on the other, as in Fig. 2, the door 31 is closed at right-hand side. If it were open, the latch 79 would move farther upward, carrying the bar 82 to the right, in which case the heaviest or left-hand end of the lever 85 would lower by gravity and lock the right-hand movement of the sliding bar 88, said latter bar being pivoted to the bell-crank 89. The knob of this bell-crank is on the outside of the door, (not here shown,) so as to be grasped by the incoming voter, who swings the door inward. We number the door as a whole 31, while the door which is hinged to the upper bar 90 at 101 and to the lower bar 100 at 102 we number 89' to distinguish one from the other, although it is one door capable of opening from both sides. To the bell-crank 89 is pivoted the lower end of a spring-actuated latch 105, like latch 79, and enters a like mortise in the bar 90. It will be seen by this construction of door and lock or latches that it is necessary to shut the door 31 before the door 89' can be opened. The reason of this is that when the door is opened the latch moves farther up through the mortise, as explained above.

We have devised means whereby the voter can vote straight by the operation of a single voting-lever. The first row of voting-levers at the left is set apart for this purpose. Beneath each row of voting-levers is a shaft 105. (Not shown in Fig. 6, but clearly appears in Figs. 10 and 15.) These shafts are parallel with and just in front of the back wall 22 and of course have suitable bearings at the ends, so that they will turn in them, which will be understood without showing the bearings here. At the left-hand ends of these shafts 105 they are provided with forwardly-projecting arms 104, Fig. 10, which arms are connected with voting-levers 25 by connecting-bars 106, said connecting-bars being pivotally attached at each end. Thus by pressing down on the handles of the first row of voting-levers the shaft for that particular voting-lever will be rotated. These shafts 105 are also provided with a series of forwardly-projecting arms 107, Fig. 15, for all of the other voting-levers at the right of the first row in Fig. 6, and said arms 107 are adapted to loosely engage their respective voting-levers, as in Fig. 15. By this means a voter may choose which party he desires to vote straight, then press down on the handle of a voting-lever of the proper horizontal row for said party, and since the shaft 105 will be turned the arm 107 will lift up on all of the other voting-levers in that row or for that party.

In order to prevent a voter from starting out of the booth, partially opening the door, (which will release the voting-levers,) and then dodging back and voting the same ticket again, we have provided the construction shown in Figs. 19, 20, 21, and 22. To the back side of one of the upright strips of the fixed frame 19 are pivoted at 166 a series of latches 165. There is to be a row of these latches for each vertical row of voting-levers, but only one row is shown in these figures. The latches have a projection a little above the lower end, forming a shoulder just a little above the voting-levers 25 when the latter are in their down position, as in Figs. 19 and 20. The latches 165 are also provided with a horizontal arm 167, extending from a point above the pivot 166 back a short distance, where a vertical rod 169 is provided with a hook 170, which hook extends back over the top of the movable frame, Fig. 21, the top of said frame being shown at 119 in said figure. Thus when the booth-door is shut and the movable frame raised it will raise on the hooked end 170 of the rod 169 and throw all of the latches 165 into position shown in Fig. 22, so that the voting-lever 25 will be free to move up when operated by the voter; but when the voter starts out of the booth and opens the door, thus lowering the movable frame, the latches will be released and fall to place over the voting-levers 25, as in Figs. 19 and 20, and thus preventing him from stepping back and repeating.

Having thus described our invention, what we claim, and desire to secure by Letters Patent of the United States, is—

1. The combination, of the booth-door, vertically-movable shutters adapted to separate by the gravity of the lower one, a lever attached to the hinge-rod of the door so as to be swung when the door opens, chains or the like attached to the shutters and passed over pulleys and shafts and levers operated by the lever of the hinge-rod to close the shutters, substantially as set forth.

2. The vertically-movable shutters for preventing access to the handles of the voting-levers, in combination with the door, the fulcrumed latch above the upper shutter, said latch having a projection against which the inwardly-opening door will press to unlatch the latch and admit of the opening of the shutters, substantially as set forth.

3. A door-frame rectangular in form and hinged at one side, a door hinged in said frame at the side opposite to that at which the door-frame is hinged, in combination with spring-actuated latches adapted to lock the door-frame and the door to the frame of the booth, the door having a knob on both sides, bell-cranks attached to the shafts of the door-knobs and pivotally attached at one end to the spring-actuated latches, a lever pivoted to the door between its two ends, one end being the heaviest and the other end being provided with a cam projection, sliding bars pivotally attached to one arm of the bell-cranks, and one of said bars being provided with a cam projection adapted to contact with the cam projection of the pivoted lever when the door is closed, whereby the door as a whole has to be closed before the supplemental door can be opened, substantially as set forth.

4. A ratchet-and-pawl lever, the latter being provided with a pawl consisting of a bow having a base-bar pivotally attached to the pawl-lever on the under side, said pawl-lever being slotted above its pivot, an arm rigidly attached to the base-bar and projecting up through the slot, and a ball in the bow contacting at the under side with the end of the arm, said base-bar being provided with projections, all combined with a ratchet-bar having projections which the projections of the base-bar are adapted to engage substantially as set forth.

5. The combination, of the double-acting door, the shutters for closing access to the handles of the voting-levers, a ratchet-bar, a pawl-lever consisting of a lever or arm attached to the hinge-rod of the door and adapted to be operated by the swinging of the door, a pawl consisting of the bow having a base-bar pivoted to the pawl-lever or arm on the under side, said pawl-lever being slotted over the pivot, a lever rigidly attached to the base-bar and projecting up through the slot and contacting with a ball in the bow, the ball adapted to play from one position to the other, said base-bar being provided with projections adapted to engage the projections of the ratchet-bar, substantially as set forth.

6. In a voting-machine, the combination of a fixed frame, a back wall, voting-levers pivoted to said back wall, a movable frame, a door having a hinge-rod and an arm rigidly attached thereto, toggle-levers pivoted to the movable frame and to suitable supports, a bar connecting said toggle-levers, and a bar connecting the arm of the hinge-rod to the connecting-bar of the toggle-lever, substantially as set forth.

7. The combination of the pivoted voting-levers, the vertically-movable frame having the lower ledges, vertical bars pivoted to the voting-levers, and elbow-levers pivoted to said bars, the upper member of said elbow-levers being adapted to contact with a bar of the movable frame, whereby when the voting-levers are raised their lower ends will rest on a ledge of the movable frame, substantially as set forth.

8. The combination of the pivoted voting-levers, the vertically-movable frame, having the lower ledges, vertical bars pivoted to the voting-levers, elbow-levers pivoted to said bars and adapted to rest on the ledge of the movable frame when the voting-levers are raised, wedges attached to the lower end of said pivoted vertical bars, two strips having stops between which strips the wedges are adapted to move, and lazy-sticks between the wedges having the upper and lower projections to keep them in place, substantially as set forth.

9. The combination of a series of voting-levers in rows, a movable frame having an upper overhanging ledge or flange, a series of hooked elbow-levers adapted to engage said overhanging flange and hold the movable frame, and a rack adapted to contact the elbow-levers to trip them when the voting-levers are operated, substantially as set forth.

10. The combination, of voting-levers, a movable frame provided with the upper flange, a hooked elbow-lever adapted to engage said flange, a rack provided with slats over each voting-lever in the vertical row and also provided with an arm adapted to raise the elbow-lever when the voting-levers are operated, substantially as set forth.

11. The combination of the back wall of a voting-booth provided with a slot, a voting-lever provided with the lower curved extension adapted to move in said slot when the voting-lever is operated, said curved extension being provided with a check-pocket, and a check for insertion in said pocket, substantially as set forth.

12. The combination, of a fixed frame and movable frame, pivoted voting-levers, a series of latches for each vertical row of voting-levers, said latches being pivotally attached to the fixed frame in position to be over the voting-levers to lock them down when the movable frame is lowered a vertical rod having a hooked upper end for catching over the top of the movable frame, the upper free arms of the latches being pivotally attached to said rod, substantially as set forth.

13. The combination of the voting-levers, pivoted between their two ends and being in vertical and horizontal rows, a rock-shaft beneath the pivoted voting-levers, an arm attached to said shaft at one end, connecting-bars pivoted at the ends to the voting-levers and to said arms, said rock-shafts being provided with other arms which loosely engage the other voting-levers, substantially as set forth.

14. In a voting-machine, the combination of the vertically-movable frame, a door for entering the booth, a hinge-rod for said door provided with a lever, a toggle-lever arrangement attached to the bottom of the movable frame, a bar connecting said toggle-lever arrangement, and said bar being pivotally attached to the lever of the hinge-rod, substantially as set forth.

In testimony of the foregoing we have hereunto set our hands in the presence of two witnesses.

RUSSELL A. HART.
ELLIS RAY HART.

Witnesses:
W. H. EDWARDS,
W. H. SMITH.